United States Patent
Joseph et al.

(10) Patent No.: US 10,480,283 B2
(45) Date of Patent: Nov. 19, 2019

(54) ELECTRIC SUB-SURFACE SAFETY VALVE (ESSSV)

(71) Applicant: Halliburton Energy Services, Inc., Houston, TX (US)

(72) Inventors: Joseph Chakkungal Joseph, Aberdeenshire (GB); Bruce Edward Scott, McKinney, TX (US); Wesley Irvin Clow, Kemah, TX (US); Aswin Balasubramanian, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/779,824

(22) PCT Filed: Mar. 23, 2016

(86) PCT No.: PCT/US2016/023810
§ 371 (c)(1),
(2) Date: May 29, 2018

(87) PCT Pub. No.: WO2017/164868
PCT Pub. Date: Sep. 28, 2017

(65) Prior Publication Data
US 2018/0347313 A1 Dec. 6, 2018

(51) Int. Cl.
*E21B 34/06* (2006.01)
*E21B 34/16* (2006.01)
(Continued)

(52) U.S. Cl.
CPC .......... *E21B 34/066* (2013.01); *E21B 34/045* (2013.01); *E21B 34/16* (2013.01); *F16K 31/082* (2013.01); *F16K 37/0025* (2013.01)

(58) Field of Classification Search
CPC ...... E21B 34/066; E21B 34/045; E21B 34/16; F16K 31/082; F16K 37/0025
(Continued)

(56) References Cited

U.S. PATENT DOCUMENTS

| 6,619,388 B2 | 9/2003 | Dietz |
| 2007/0007001 A1 | 1/2007 | Hiron et al. |

(Continued)

FOREIGN PATENT DOCUMENTS

| WO | 2014011148 A1 | 1/2014 | |
| WO | WO-2014011148 A1 * | 1/2014 | .......... E21B 47/122 |
| WO | 2014116200 A1 | 7/2014 | |

OTHER PUBLICATIONS

International Search Report and Written Opinion dated Dec. 16, 2016; International PCT Application No. PCT/US2016/023810.
(Continued)

*Primary Examiner* — Anna M Momper
*Assistant Examiner* — Patrick F Lambe
(74) *Attorney, Agent, or Firm* — McGuireWoods LLP (57) ABSTRACT

Disclosed herein are embodiments of a fail-safe surface controlled electric subsurface safety valve for use in a well. For example, in one embodiment, an electric sub-surface safety valve (eSSSV) system is disclosed that includes a master control system; a subsea control module; and an electric sub-surface safety valve having dual, redundant electronic modules that are configured to control power to dual electromagnetic actuators that move a single valve.

20 Claims, 8 Drawing Sheets

(51) Int. Cl.
  *F16K 31/08* (2006.01)
  *F16K 37/00* (2006.01)
  *E21B 34/04* (2006.01)
(58) Field of Classification Search
  USPC .......................................................... 166/321
  See application file for complete search history.

(56) References Cited

U.S. PATENT DOCUMENTS

| | | |
|---|---|---|
| 2009/0050327 A1 | 2/2009 | Anderson et al. |
| 2011/0137471 A1* | 6/2011 | Dailey, Jr. ........... E21B 33/0355 |
| | | 700/282 |
| 2012/0205115 A1 | 8/2012 | Head |
| 2014/0015449 A1 | 1/2014 | Biester et al. |
| 2014/0367113 A1 | 12/2014 | Kleine et al. |

OTHER PUBLICATIONS

European Search Report dated Jul. 23, 2019, European Patent Application No. 16895675.3.

\* cited by examiner

ELECTRIC SUB-SURFACE SAFETY VALVE (ESSSV)

BACKGROUND

The present disclosure relates to oil and gas exploration and production, and more particularly to a fail-safe surface controlled electric subsurface safety valve for use in a well.

Wells are drilled at various depths to access and produce oil, gas, minerals, and other naturally-occurring deposits from subterranean geological formations. Wells are also drilled in a variety of environments, including in deep water where ocean floor conditions may be softer or more unconsolidated for desired when drilling.

In order to prevent injury to personnel and to protect the environment and equipment, many hydrocarbon producing wells contain a subsurface safety valve (SSSV) located down hole in the production string, generally at least 50 meters below the sea floor, to shut off hydrocarbon flow in the event of an emergency. Current SSSV uses high pressure hydraulic fluid to close or open the safety valve.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity. In addition, as used herein, the singular forms "a", "an" and "the" are intended to include the plural forms as well, unless the context clearly indicates otherwise.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to". Unless otherwise indicated, as used throughout this document, "or" does not require mutual exclusivity.

The following written description discloses an electric sub-surface safety valve (eSSSV) that provides a fail-safe system to shut in the well as deemed necessary. For example, embodiments of an eSSSV disclosed herein include dual, redundant electronic modules that control power to two independent, redundant electromagnetic actuators that move a single valve.

Technical advantages of the disclosed embodiments include allowing wells to be completed without the need for high pressure hydraulic lines necessary to actuate electric solenoid controlled hydraulic valves. Another technical advantage of the disclosed embodiments is to provide a fault tolerant, redundant electric safety valve system solution that is fully electric and capable of withstanding the high temperature and high pressure of the harsh downhole environment. Still, another technical advantage of the disclosed embodiments is the ability to monitor vital parameters of the valve. These vital parameters may be used for many things including, but not limited to, trending, checking the health of the valve, and managing valve parameters to extend the life of the valve.

Figure 1A:
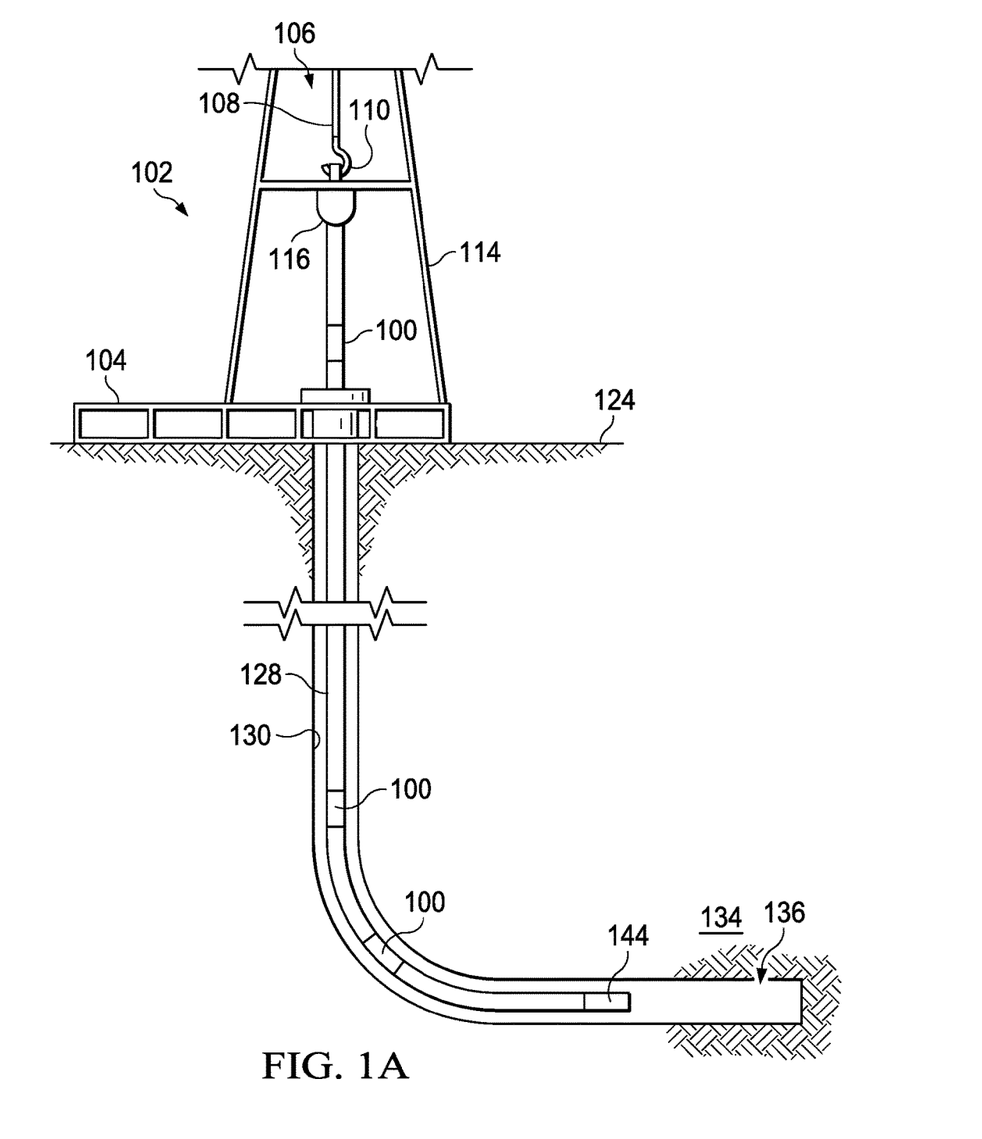
FIG. 1A is a diagram of an on-shore well in which a tool string is deployed according to an illustrative embodiment.

Beginning with FIG. 1A, a schematic view of a rig 104 in which a tool string 128 is deployed is presented in accordance with an illustrative embodiment. The rig 104 is positioned onshore at a surface 124 of a well 102. The well 102 includes a wellbore 130 that extends from the surface 124 of the well 102 to a subterranean substrate or formation 134. Tool string 128 may deploy running tools used to place or set downhole equipment 144 such as, but not limited to, liner hangers, plugs and packers. For instance, in one embodiment, a running tool may be used to set one or more eSSSV 100 as disclosed herein to provide a fail-safe system to shut in the well 102 as deemed necessary.

Figure 1B:
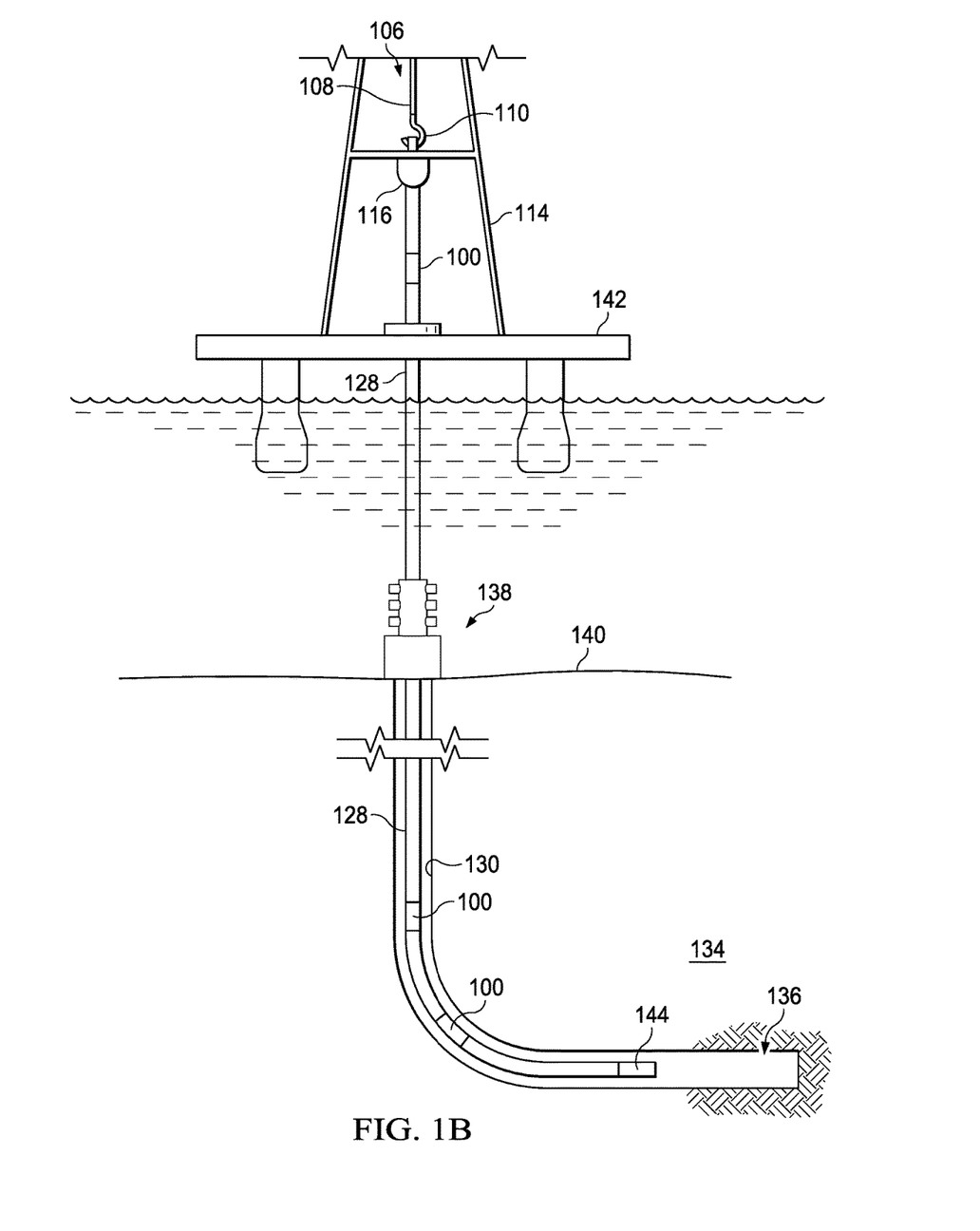
FIG. 1B is a diagram of an off-shore well in which a tool string is deployed according to an illustrative embodiment.

Similarly, FIG. 1B illustrates a schematic view of an offshore platform 142 operating a tool string 128 that includes one or more eSSSV 100. The eSSSV 100 in FIG. 1B may be deployed in a sub-sea well 138 accessed by the offshore platform 142. The offshore platform 142 may be a floating platform or may instead be anchored to a seabed 140.

FIGS. 1A-1B each illustrate possible uses or deployments of the eSSSV 100, which in either instance may be used in tool string 128 to deploy the downhole equipment 144. In the embodiments illustrated in FIGS. 1A and 1B, the wellbore 130 has been formed by a drilling process in which dirt, rock and other subterranean material has been cut from the formation 134 by a drill bit operated via a drill string to create the wellbore 130. During or after the drilling process, a portion of the wellbore may be cased with a casing (not illustrated in FIGS. 1A and 1B). In other embodiments, the wellbore may be maintained in an open-hole configuration without casing.

The tool string 128 may include sections of tubing, each of which are joined to adjacent tubing by threaded or other connection types. The tool string 128 may refer to the collection of pipes, mandrels or tubes as a single component, or alternatively to the individual pipes, mandrels, or tubes that comprise the string. The term tool string is not meant to be limiting in nature and may include a running tool or any other type of tool string used to deploy the downhole equipment 144 in the wellbore. In some embodiments, the tool string 128 may include a passage disposed longitudinally in the tool string 128 that is capable of allowing fluid communication between the surface 124 of the well 102 and a downhole location 136.

The lowering of the tool string 128 may be accomplished by a lift assembly 106 associated with a derrick 114 positioned on or adjacent to the rig 104 or offshore platform 142. The lift assembly 106 may include a hook 110, a cable 108, a traveling block (not shown), and a hoist (not shown) that cooperatively work together to lift or lower a swivel 116 that is coupled an upper end of the tool string 128. The tool string 128 may be raised or lowered as needed to add additional sections of tubing to the tool string 128 to position the distal end of the tool string 128 at the downhole location 136 in the wellbore 130.

Figure 2:
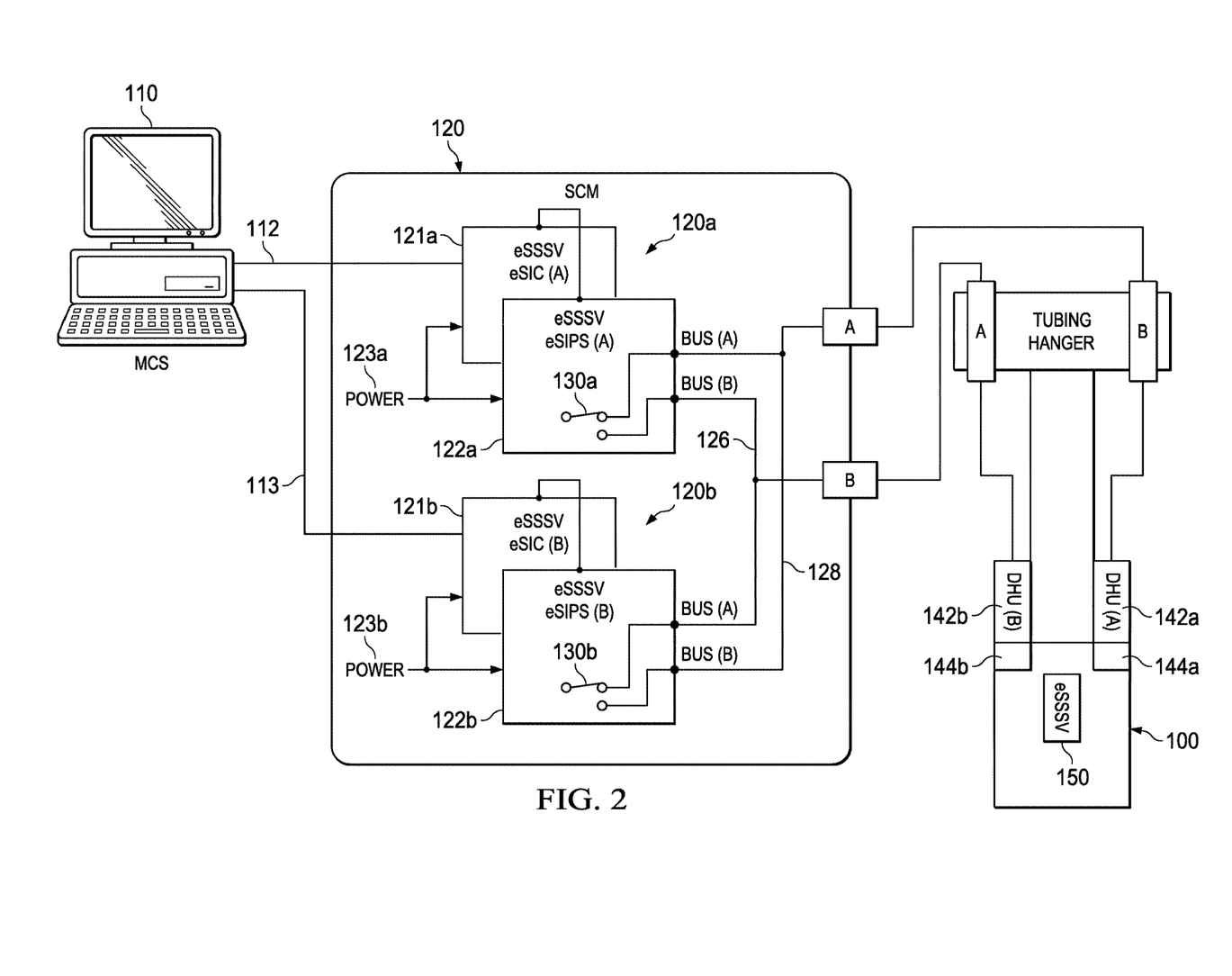
FIG. 2 is a schematic view of an eSSSV System Level Architecture according to an illustrative embodiment.

FIG. 2 is a schematic view of an eSSSV system level architecture according to an illustrative embodiment. As depicted in FIG. 1, the eSSSV system level architecture includes a master control system (MCS) 110. The MCS 110 is a specially configured system having the necessary hardware and software for performing the features disclosed herein. For example, at a minimum, the MCS 110 would include at least one processing unit or processor for executing instructions, memory for storing the instructions and other data used by the processor, and one or more communication interfaces such as input/output interfaces for receiving input/data and displaying information, and one or more network interfaces for communicating data over a network. The instructions may include, but are not limited to, machine code instructions, bytecode for a software interpreter, object code, and source code in a high-level programming language. The MCS 110 may also include input devices such as, but not limited to, a keyboard, a mouse, and a touchscreen.

In the depicted embodiment, the MCS 110 has dual, independent, redundant communication links 112, 113 to a subsea control module (SCM) 120 that enables communication of data and instructions between the MCS 110 and the SCM 120. The dual communication links 112, 113 may use various communication protocols or standards for communication with the SCM 120 such as, but not limited to, intelligent well interface standardization (IWIS), RS232, RS4xx (e.g., RS422), Ethernet, transmission control protocol/internet protocol (TCP/IP), Modbus®, Modbus TCP and production markup language (ProdML™).

The SCM 120 includes two independent control modules 120A and 120B. Control module 120A includes an eSSSV IWIS controller card (eSIC) 121a and an eSSSV IWIS power supply card (eSIPS) 122a. Control module 120B includes an eSIC 121b and an eSIPS 122b. In certain embodiments, the SCM 120 includes two independent power sources 123a, 123b. The power source 123a is configured to provide power to the eSIC 121a and the eSIPS 122a. The power source 123b is configured to provide power to the eSIC 121b and the eSIPS 122b. In the depicted embodiment, the eSIC 121a is communicatively coupled to the MCS 110 via communication link 112, while the eSIC 121b is communicatively coupled to the MCS 110 via communication link 113.

In one embodiment, the eSIPS 122a and the eSIPS 122b are connected by two circuit paths 126 and 128 that are both connected to an output A and an output B. The eSIPS 122a and the eSIPS 122b each respectively include an electronic feed-through switch 130a, 130b that is used to set which path/output (A and/or B) receives the control/output signal. As will be further described below, the switch enables the independent control modules 120a and 120b to either communicate independently or in tandem with two downhole electronics unit coupled to an eSSSV 100.

In one embodiment, output A and output B of the SCM 120 connect to the eSSSV 100 downhole using standard tubing-encapsulated conductor (TEC) downhole cable. In one embodiment, the communications architecture includes power over communications line technology. This allows for a single line to save space in the penetration area. The receiver has analog and digital filtering for a very robust communications system in a noisy and harsh environment. The high field-programmable gate array (FPGA) digital sampling rate of the incoming communication signal also acts as a low pass filter with a high roll-off further filtering the incoming signal to help ensure that the electronics modules receives the command from the surface. The FPGA firmware controlled receiver is an FSK based scheme with an adaptive baud rate. The algorithm for decoding the incoming signal is very tolerant to wide changes in the carrier frequency and extremely tolerant to wide duty cycle changes (i.e. 3% to 97%). One advantage of the disclosed embodiments is that by using a firmware based decoder instead of using hardware circuitry, the system is insensitive to temperature changes. This reduces the number and size of the components as well as adds reliability and flexibility.

In addition, the overall system design allows for a very low signal-to-noise ratio (SNR). This means that even in the presence of a low magnitude communications signal intermingled with large magnitude low and high frequency noise, the receiver will still function correctly. The communication transmitter places the bus in a high-z state when not in use. In one embodiment, the transmitter has 8 channels of redundant current drive for redundancy and greater outgoing signal strength. The transmitted signal is also received and may be decoded to detect faults and abnormalities in the communications channel, and take mitigation measures in real-time.

In the disclosed embodiments, the eSSSV 100 has two independent, redundant downhole electronics unit (DHU) 142a, 142b and two independent, redundant electromagnetic actuators 144a, 144b that move a single valve 150. In one embodiment, the valve 150 consists of an outer rare earth magnet coupled to a magnet inside the casing of the eSSSV 100. The independent control modules 142a, 142b and independent electromagnetic actuators 144a, 144b can individually or in tandem drive the valve 150 open. In a similar fashion, either one or both of the electromechanical actuators 144a, 144b are capable of holding the valve 150 open.

In certain embodiments, beyond the actuation of a valve, the electronic control modules 120A and 120B also have on-board temperature and pressure sensors. This adds to the amount of data that may be analyzed at the surface, so that the operator has more information to make operational decisions. For example, the pressure sensor indicates whether the outer housing is comprised. The temperature sensor provides the internal electronic chamber temperature, which is closely coupled to the external environment. The temperature sensor may be used to roughly determine the outer temperature and can warn of internal issues that are causing excessive heat.

Although FIG. 2 only depicts only a single SCM 120 and a single eSSSV 100, the system architecture is designed to be a multi-node system, so there could be one or more eSSSVs in series at different depths, as illustrated in FIG. 1A and FIG. 1B, to increase redundancy for greater fault tolerance or for multi-zonal isolation and control. Additionally, in certain embodiments, one SCM 120 may be used to control multiple eSSSVs.

Figure 3:
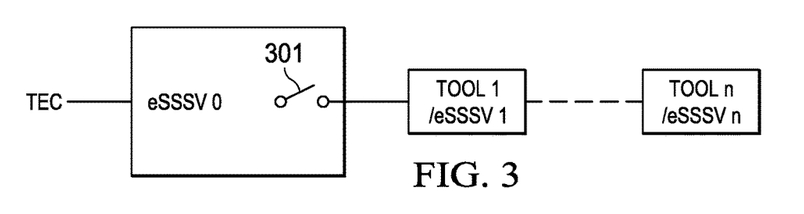
FIG. 3 is a schematic view of a multiple node configuration according to an illustrative embodiment.

Additionally, in some embodiments, the system is also designed to be used with other pressure and temperature sensors, flowmeters, or other hydraulic valve tools or any other tools communicating with the same protocol. All these tools may be on the same, single line TEC conductor downhole as shown in FIG. 3. If there is a short in the line below the eSSSV installation point, it can be isolated by closing the electronic feed-thru switch 301.

Figure 4:
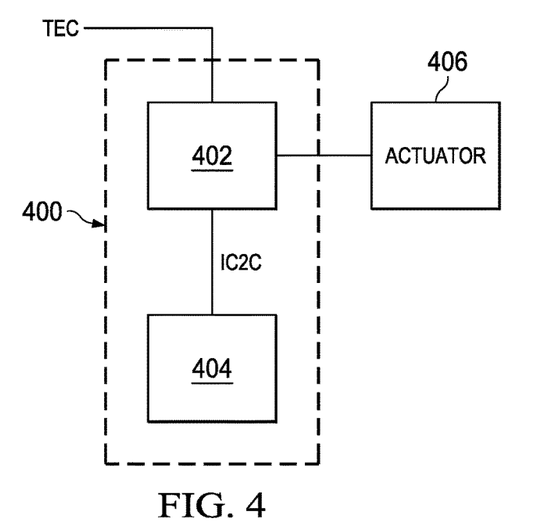
FIG. 4 is a schematic view of an eSSSV downhole electronics assembly with built-in pressure and temperature (PT) gauges according to an illustrative embodiment.

Alternatively, FIG. 4 illustrates a schematic view of a single node with built-in pressure and temperature (PT) gauges according to an illustrative embodiment. In the depicted embodiment, the eSSSV downhole electronics assembly 400 includes a DHU 402 and a pressure transducer 404. In one embodiment, the DHU 402 is configured to, among other things, control actuator 406; measure pressure (P), temperature (T), vibration, velocity (V), and intensity (I); communicate via Modbus, and is provisioned to interface with the pressure transducer 404. A non-limiting example of the pressure transducer 404 that may be used is a Quartzdyne™ PT Transducer. Gauges positioned above and below the valve could be used for, among other things, detecting leaks, flow rate, and the position of the valve.

Figure 5:
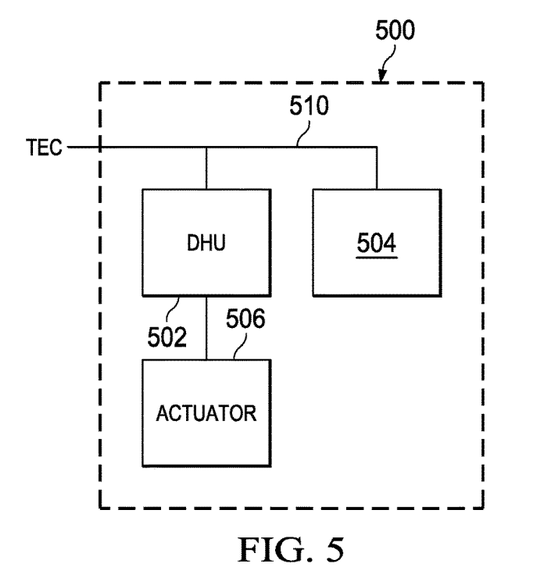
FIG. 5 is a schematic view an eSSSV downhole electronics assembly in a multi-drop design according to an illustrative embodiment.

FIG. 5 illustrates another embodiment of an eSSSV downhole electronics assembly 500. In this embodiment, the eSSSV downhole electronics assembly 500 implements a multi-drop design in which the PT gauges may be part of the valve. For instance, as shown in FIG. 5, a DHU 502 and a PT gauge 504 may be dropped in parallel from the same TEC downhole cable 510. A non-limiting example of the PT gauge 504 that may be used is a ROC-X™ PT gauge produced by the Halliburton® Company. Similar to FIG. 4, the DHU 502 may be configured to, among other things, control actuator 506; measure P, T, vibration, V, and I; and communicate via Modbus.

Figure 6:
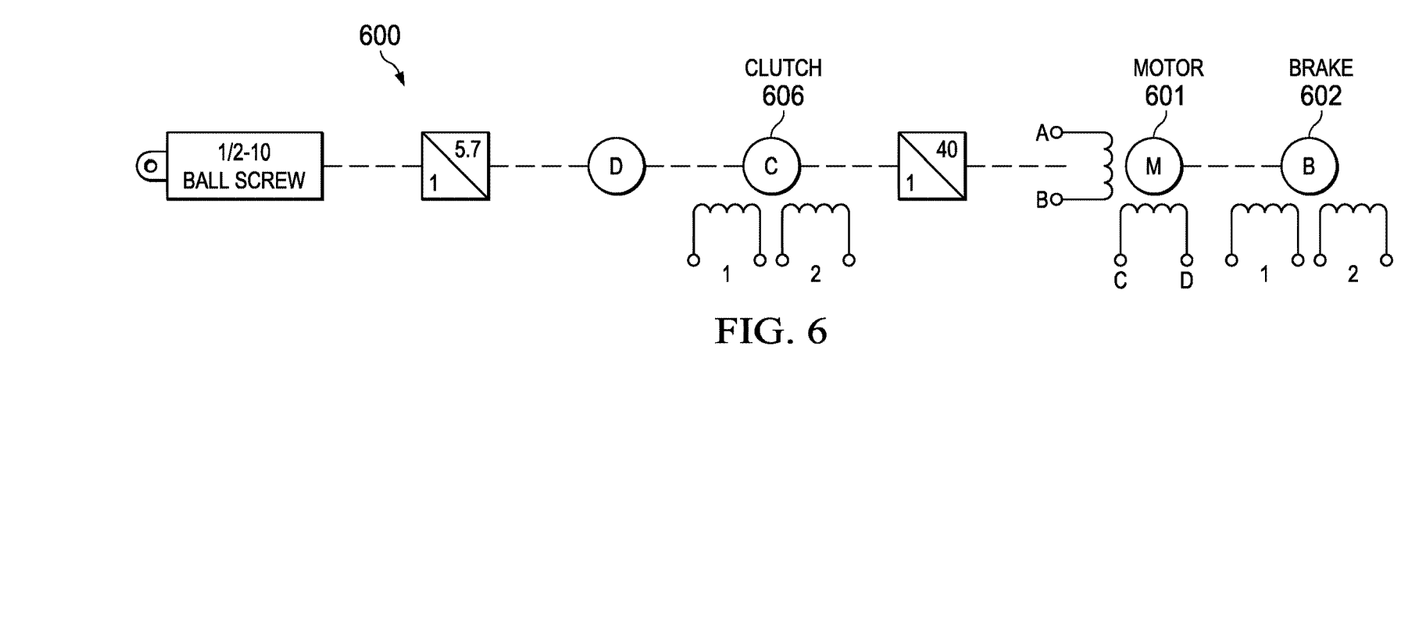
FIG. 6 is an electrical/mechanical schematic of an actuator according to an illustrative embodiment.

Referring now FIG. 6, an electrical/mechanical schematic of an actuator 600 is presented in accordance with an illustrative embodiment. As described above, and as shown in FIG. 2, the disclosed embodiments include redundant actuators. FIG. 6 provides an example of just one of the actuators.

In the depicted embodiment, the actuator 600 includes a motor 601 having two coils, an AB coil and a CD coil. In one embodiment, the motor 601 needs both the AB and the CD coils to work. In some embodiments, the motor 601 may also include redundant coils for both the AB and the CD coils to provide even more control flexibility and reliability.

For instance, in the depicted embodiment, both the clutch 606 and brake 602 are shown with redundant coils (coil 1 and coil 2). In this embodiment, operation of the clutch 606 or brake 602 only requires the use of one coil.

Figure 7:
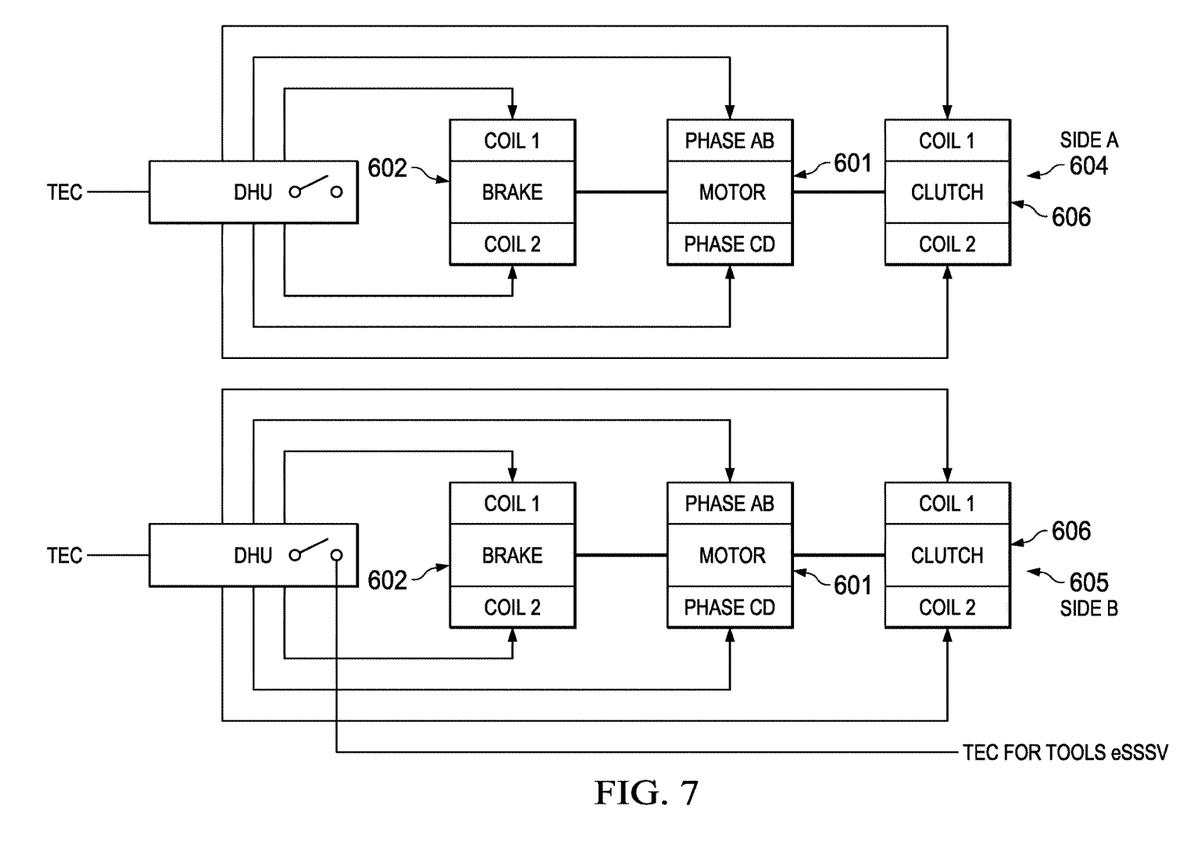
FIG. 7 is a schematic view of a Fully Isolated Redundant System according to an illustrative embodiment.
Figure 8:
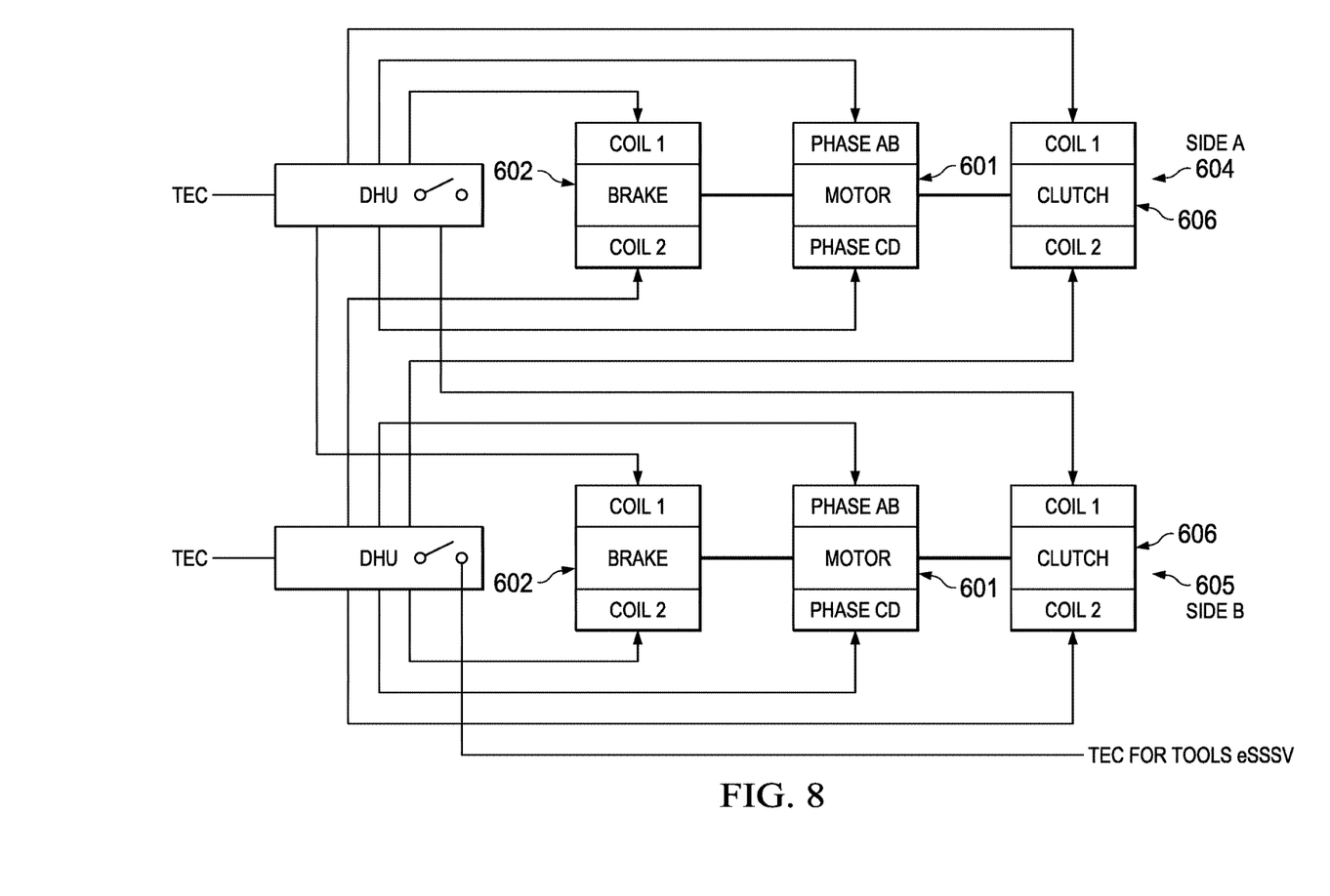
FIG. 8 is a schematic view of a Non-Isolated System with Cross Control according to an illustrative embodiment.

FIG. 7 and FIG. 8 illustrate a couple of ways to use the redundant coils in accordance with the disclosed embodiments. For example, the system may be configured as a fully isolated reductant system as illustrated in FIG. 7 where Side A 604 (first actuator) is isolated from Side B 605 (second actuator). Alternatively, the system may be configured as a non-isolated system with cross control between Side A and Side B as illustrated in FIG. 8.

Switching from Side A to Side B may be done while the linear motor 601 is in motion or "motoring" or while it is in the holding or "braked" position. This allows for even wear leveling, so that Side A and Side B are used an equivalent amount of time to increase the lifetime of the tool. With both sides capable of driving the valve open independently the redundancy of the system allows for greater system reliability. The redundancy also leads to greater fault tolerance. Internal to each of the Side A and Side B control modules there are two brakes 602 and two clutches 606, so that either of the two internal brake control modules from Side A or Side B can hold the valve closed. Thus, there are eight possible combinations to control the clutch 606 and brake 602 for a system. For example, brake two from Side B could be used with clutch 1 from Side A.

The dual actuator design inherently allows for wear leveling, extending the lifetime and reliability of the tool by managing the actuators in such a way that each has the same amount of use time. In one embodiment, the eSSSV is held in the normally closed position by a large spring force, so that in the event of a power loss or a surface level failure, the spring force will automatically close the valve. In certain embodiments, there is a dampener built into the actuator, so that the valve closes at a safe speed.

In some embodiments, with each actuator there is a position sensor. The position sensor is used for precise control. It gives the operator at the surface more information about the status of the system. This goes well beyond a simple open and close indication. For example, in one embodiment, the position sensor indicates the speed of the valve opening or closing. It may also show potential issues or degradation before the valve reaches the end of its life cycle.

In one embodiment, the actuator motor driver analog control architecture senses the voltage and current to the stepper motors. These parameters are digitally monitored to protect the actuator in the event of an over current or over voltage event. It can also give vital information about the health and status of the motors.

Figure 9:
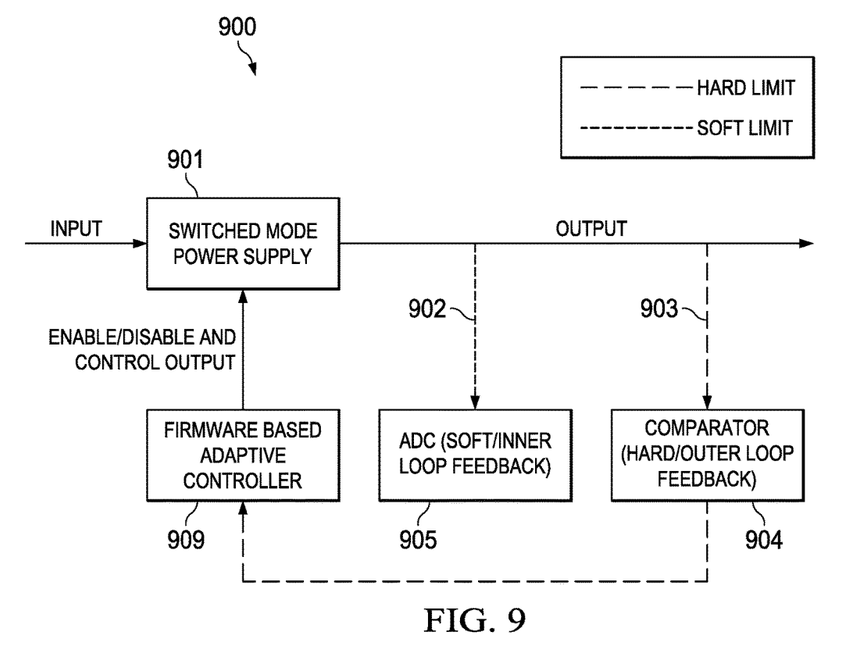
FIG. 9 is a schematic view of a switched mode power supply with firmware adaptive control and redundant feedback loops according to an illustrative embodiment.

In some embodiments, the primary source of power for the clutch 606, motor 601, and brake 602 supply is a buck-type switched mode power supply 901 as indicated in FIG. 9. In certain embodiments, the configuration of the switched mode power supply 901 includes a novel control architecture and application. For instance, in one embodiment, a primary firmware based adaptive controller 909 is used to enable/disable and control output of the buck-type switched mode power supply 901. In one embodiment, the primary firmware based adaptive controller 909 is custom FPGA code and does not require a separate analog pulse width modulation (PWM) controller integrated circuit (IC). Using firmware based control instead of a separate PWM controller IC makes the system insensitive to temperature changes. This reduces the number and size of the components as well as provides additional reliability and flexibility.

Additionally, in the depicted embodiment, the design may include dual feedback loops 902 and 903. In one embodiment, feedback loop 903 is based on a simple comparator 904 with hardware or software settable setpoint that may be sampled at high speeds, up to the speed at which the FPGA internal clock is operating at. This hard outer limit may be used to ensure that if the power supply reaches specific limits, the controller will quickly react and reduce or increase the output voltage accordingly. The inner feedback loop 902 or soft loop source is from an analog-to-digital converter (ADC) 905 conversion. In one embodiment, the ADC 905 has software settable set points to control the output voltage to a tight tolerance range. The dual loop feature also adds safety in the sense that if one feedback loop fails, then there is another that may be used independently. There is also current sense and voltage sense to shut down the system in the event of a high voltage or current. These limits are software settable so that there is maximum flexibility in the power supply control scheme.

Along with all the other ADC measurements in the system, the toolhead voltage and current are measured and monitored. In one embodiment, the ADC 905 system is comprised of a single channel ADC with multi-node inputs switched onto a single analog buffered bus. This allow for expansion of as many analog measurements as desired. It also allows for multinode failures. For example, if there is a failure on a particular node, then leaving the switch to the ADC bus off for that node will protect the downstream electronics and isolate the failure. The intermediary analog switch protects each of the input nodes by isolating it from the primary bus.

Figure 10:
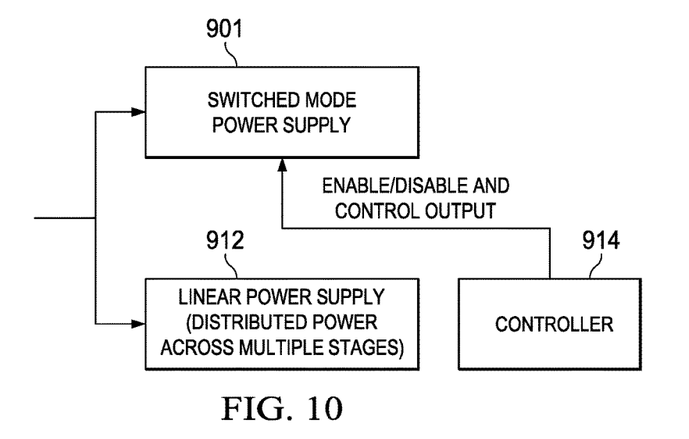
FIG. 10 is a schematic view of dual power supply architecture according to an illustrative embodiment.

In some embodiments, the power architecture of the electronic control module is also unique. For instance, as described above, in one embodiment, it has a high power buck switched mode power supply 901 to source energy to the brake, clutch and actuator motor. However, in certain embodiments, a dual power supply architecture may be implemented as illustrated in FIG. 10. In the depicted embodiment, the power supply architecture also includes a secondary low voltage power supply 912 that is dedicated to the low voltage 5V and 3.3V logic ICs. This means that a failure of the high power supply 901 will not result in full tool blackout. The tool will still respond and give vital system information. This also means that the high voltage power supply 901 only needs to be activated by the controller 914 when necessary; thus extending the lifetime and reliability of the circuit. In one embodiment, the low voltage power supply 910 is a multi-stage linear regulator, so it is simple in its design and with fewer components is less prone to failure. Additionally, the low voltage power supply 910 is more robust and has lower noise output than the switched mode power supply 901. The number of series power pass elements may be increased to allow for a greater input voltage or higher current, so the design is modular and expandable.

Additionally, in one embodiment, the surface system has a unique dual bus architecture. If one bus fails to power the downhole tool, the secondary bus may be used for power. The low voltage power supply and the buck switched mode power supply operate with a wide input range, so that a fixed voltage may be set at the surface and the tool will operate normally independent of the TEC length or the properties of any particular TEC. Regardless of the resistance, inductance or capacitance of the particular TEC the tool will still operate properly. On the other hand, the surface voltage may also be carried to higher or lower voltages depending on the downhole load condition, temperatures and the TEC length or tool deployment depth.

Accordingly, the above disclosed embodiments provide many advanced features of an electronic polyimide PCB based control modules designed for safe, redundant and complex control of an electric subsurface safety valve. One primary advantage of the disclosed eSSSV is to overcome the necessity and dependence on subsea vendors to provide required pressure (pod pressure) on hydraulic lines to move completion tools valves along with minimal use of wellhead penetrations, but while still providing high reliability through redundancy. Thus, the disclosed eSSSV system allows for a fully electric completion without the need for high pressure hydraulic lines.

Another advantage of the disclosed embodiments is that it provides a wealth of data from the electronic control and communication modules to the well operator to better understand the well conditions and the condition of the safety valve equipment itself including self-diagnostic information that will aid in early detection of a possible failure in the safety valve. For example, in one embodiment, this includes a valve position sensor that provides the position of the valve, not just an open or closed indication. The temperature inside the weldment is thermally coupled to the ambient temperature, so that changes in temperature at the valve may be sensed and reported to the operator. The pressure inside the weldment is sensed, so that any degradation of the weld on the electronic housing may be sensed as pressure inside increases or if there is any outgassing due to materials inside the electronic weldment. This gives early, advanced warning of possible issue before they occur. The system level currents and voltages are reported; so that any degradation in the electronics or the cabling is visible and preventative action may be taken as deemed necessary.

Additionally, as described above, each electro-magnetic actuator is comprised of a clutch, motor, dampener, brake and more. The closure of the valve at a safe speed is accomplished by an electro-mechanical dampener that slows the speed of the valve closing. This avoids a rapid closure that could result in damage due to quickly changing pressure.

Further, in some embodiments, the eSSSV may operate on a twisted pair cable or operate on a single conductor with the completion used as a return path. This means that it will operate with a shared return path with other gauges and tools.

It should be apparent from the foregoing that embodiments of an invention having significant advantages have been provided. While the embodiments are shown in only a few forms, the embodiments are not limited but are susceptible to various changes and modifications without departing from the spirit thereof.

Further, the steps of the methods described herein may be carried out in any suitable order, or simultaneously where appropriate. Thus, the scope of the claims should not necessarily be limited by the above description, which is merely provided as examples to enable one of ordinary skill in the art to practice the appended claims.

Moreover, while the appended claims recite specific combinations of features of the disclosed embodiments, other combinations of the claims may include one or more of the following features combine in any number of combinations. In other words, it is intended that the disclosed embodiments support amendments to the appended claims or new claims that combine or omit various steps or features of the disclosed embodiments in any combination other than those specifically recited in the current appended claims. For example, a claimed electric sub-surface safety valve or electric sub-surface safety valve system may include one or more of the following clauses, or portions of the following clauses, combine in any number of combinations:

a master control system;

a subsea control module;

an electric sub-surface safety valve comprising dual, redundant electronic modules consisting of a first downhole electronics unit and a second downhole electronics unit that are configured to control power to a first electromagnetic actuator and a second electromagnetic actuator that move a single valve;

the first electromagnetic actuator and the second electromagnetic actuator individually or in tandem move or maintain a position of the single valve;

additional well tools downstream from the electric sub-surface safety valve along a same, single tubing-encapsulated conductor (TEC) downhole cable;

the electric sub-surface safety valve includes an electronic feed-thru switch that can be closed in response to a short occurring downstream from the electric sub-surface safety valve;

the first downhole electronics unit and the second downhole electronics unit each include built-in pressure and temperature (PT) gauges;

the first electromagnetic actuator comprises a first brake, a first motor, and a first clutch; and wherein the second electromagnetic actuator comprises a second brake, a second motor, and a second clutch;

the first electromagnetic actuator and the second electromagnetic actuator each include a built in dampener configured to close the single valve at a safe speed;

the first electromagnetic actuator and the second electromagnetic actuator each include a position sensor indicates whether the single valve is open or closed and an opening or closing speed of the single valve;

the first electromagnetic actuator and the second electromagnetic actuator is powered by a buck-type switched mode power supply that includes a control architecture that implements a dual feedback loop for controlling an output voltage of the buck-type switched mode power supply;

the first electromagnetic actuator and the second electromagnetic actuator is powered using a dual power supply architecture;

a first communication link and a second communication link between the master control system and the subsea control module;

a first control module and a second control module in the subsea control module, wherein the first communication link is coupled to the first control module and wherein the second communication link is coupled to the second control module;

a first power source and a second power source in the subsea control module, the first power source providing power to the first control module and the second power source providing power to the second control module;

the first control module comprises of a first eSSSV controller card and first eSSSV power supply card the second control module comprises of a second eSSSV controller card and second eSSSV power supply card the first control module and the second control module each comprise on-board temperature and pressure sensors the first control module and the second control module connect to a first output that is connected to the first downhole electronics unit and to a second output that is connected to the second downhole electronics unit;

the first control module and the second control module each comprising a circuit switch for selecting one of the first output and the second output;

the first output is connected to the first downhole electronics unit using a first TEC downhole cable;

the second output is connected to the second downhole electronics unit using a second TEC downhole cable;

the first TEC downhole cable and/or the second TEC downhole cable include power over communications line technology;

the first downhole electronics unit and the first brake, the first motor, and the first clutch of the first electromagnetic actuator is fully isolated from the second downhole electronics unit and the second brake, the second motor, and the second clutch of the second electromagnetic actuator;

the first downhole electronics unit and the second downhole electronics unit are configured to enable cross control between the first brake, the first motor, the first clutch, the second brake, the second motor, and the second clutch; and the subsea control module is configured to use the first electromagnetic actuator and the second electromagnetic actuator an equivalent amount of time;

We claim:

1. An electric sub-surface safety valve (eSSSV) system comprising:

a master control system;

a subsea control module; and an electric sub-surface safety valve comprising dual, redundant electronic modules consisting of a first downhole electronics unit and a second downhole electronics unit that are configured to control power to a first electromagnetic actuator and a second electromagnetic actuator that move a single valve;

wherein at least one electronic module comprises a feed-through switch;

wherein the switch enables the modules to either communicate independently or in tandem with the downhole electronics units.

2. The eSSSV system according to claim 1, wherein the first electromagnetic actuator and the second electromagnetic actuator individually or in tandem move or maintain a position of the single valve.

3. The eSSSV system according to claim 1, further comprising additional well tools downstream from the electric sub-surface safety valve along a same, single tubing-encapsulated conductor (TEC) downhole cable, and wherein the electric sub-surface safety valve includes an electronic feed-thru switch that can be closed in response to a short occurring downstream from the electric sub-surface safety valve.

4. The eSSSV system according to claim 1, wherein the first downhole electronics unit and the second downhole electronics unit each include built-in pressure and temperature (PT) gauges.

5. The eSSSV system according to claim 1, wherein the first electromagnetic actuator comprises a first brake, a first motor, and a first clutch; and wherein the second electromagnetic actuator comprises a second brake, a second motor, and a second clutch.

6. The eSSSV system according to claim 5, wherein the first downhole electronics unit and the first brake, the first motor, and the first clutch of the first electromagnetic actuator is fully isolated from the second downhole electronics unit and the second brake, the second motor, and the second clutch of the second electromagnetic actuator.

7. The eSSSV system according to claim 6, wherein the subsea control module is configured to use the first electromagnetic actuator and the second electromagnetic actuator an equivalent amount of time.

8. The eSSSV system according to claim 5, wherein the first downhole electronics unit and the second downhole electronics unit are configured to enable cross control between the first brake, the first motor, the first clutch, the second brake, the second motor, and the second clutch.

9. The eSSSV system according to claim 1, wherein the first electromagnetic actuator and the second electromagnetic actuator each include a built in dampener configured to close the single valve at a safe speed.

10. The eSSSV system according to claim 1, wherein the first electromagnetic actuator and the second electromagnetic actuator each include a position sensor indicates whether the single valve is open or closed and an opening or closing speed of the single valve.

11. The eSSSV system according to claim 1, wherein the first electromagnetic actuator and the second electromagnetic actuator is powered by a buck-type switched mode power supply that includes a control architecture that implements a dual feedback loop for controlling an output voltage of the buck-type switched mode power supply.

12. The eSSSV system according to claim 1, wherein the first electromagnetic actuator and the second electromagnetic actuator is powered using a dual power supply architecture.

13. The eSSSV system according to claim 1, further comprising:
a first communication link and a second communication link between the master control system and the subsea control module; and
a first control module and a second control module in the subsea control module, wherein the first communication link is coupled to the first control module and wherein the second communication link is coupled to the second control module.

14. The eSSSV system according to claim 13, further comprising:
a first power source and a second power source in the subsea control module, the first power source providing power to the first control module and the second power source providing power to the second control module.

15. The eSSSV system according to claim 13, wherein the first control module comprises of a first eSSSV controller card and first eSSSV power supply card, and wherein the second control module comprises of a second eSSSV controller card and second eSSSV power supply card.

16. The eSSSV system according to claim 13, wherein the first control module and the second control module each comprise on-board temperature and pressure sensors.

17. The eSSSV system according to claim 13, wherein the first control module and the second control module connect to a first output that is connected to the first downhole electronics unit and to a second output that is connected to the second downhole electronics unit, the first control module and the second control module each comprising a circuit switch for selecting one of the first output and the second output.

18. The eSSSV system according to claim 17, wherein the first output is connected to the first downhole electronics unit using a first tubing-encapsulated conductor (TEC) downhole cable, and wherein the second output is connected to the second downhole electronics unit using a second TEC downhole cable.

19. The eSSSV system according to claim 18, wherein the first TEC downhole cable and the second TEC downhole cable include power over communications line technology.

20. An electric sub-surface safety valve comprising:
dual, redundant electronic modules consisting of a first downhole electronics unit and a second downhole electronics unit;
a first electromagnetic actuator and a second electromagnetic actuator; and
a valve;
wherein at least one electronic module comprises a feed-through switch;
wherein the switch enables the modules to either communicate independently or in tandem with the downhole electronics units.

* * * * *